United States Patent [19]
Suda et al.

[11] Patent Number: 5,366,613
[45] Date of Patent: Nov. 22, 1994

[54] METHOD OF ELECTROCHEMICAL FINE PROCESSING

[75] Inventors: Masayuki Suda; Toshihiko Sakuhara; Masataka Shinogi; Fumiharu Iwasaki; Akito Ando, all of Tokyo, Japan

[73] Assignee: Seiko Instruments Inc., Tokyo, Japan

[21] Appl. No.: 38,921

[22] Filed: Mar. 29, 1993

[30] Foreign Application Priority Data

Mar. 30, 1992 [JP] Japan .................................. 4-074733
Mar. 31, 1992 [JP] Japan .................................. 4-078031

[51] Int. Cl.$^5$ .......................... C25D 11/00; C25F 3/00
[52] U.S. Cl. .................................... 205/221; 205/223; 204/129.1; 204/129.65
[58] Field of Search ............. 204/129.1, 129.5, 129.55, 204/129.65; 205/221, 223

[56] References Cited

U.S. PATENT DOCUMENTS

| | | | |
|---|---|---|---|
| 2,492,214 | 12/1949 | Fonda ........................ | 204/129.65 X |
| 3,035,990 | 5/1962 | Davis et al. ....................... | 205/118 |
| 3,325,384 | 6/1967 | Frantzen ........................ | 204/129.55 |
| 5,149,404 | 9/1992 | Blonder et al. .................. | 204/129.1 |

FOREIGN PATENT DOCUMENTS

| | | |
|---|---|---|
| 0154572 | 9/1985 | European Pat. Off. . |
| 352541 | 4/1961 | Switzerland . |
| 2206541 | 1/1989 | United Kingdom . |

*Primary Examiner*—Donald R. Valentine
*Attorney, Agent, or Firm*—Spensley Horn Jubas & Lubitz

[57] ABSTRACT

An electrochemical fine processing method for forming a pattern of a substance having different etching resistance against an etching solution from that of an article by bringing the minute forward end of the counter electrode close to the surface of the article. The counter electrode is applied a predetermined electric potential and the electrochemical reaction is repeating in a minute region of the article in the vicinity of the counter electrode to form an optional pattern. After forming the pattern, the article is etched in an etching solution having a property of different etching rate for the pattern forming portion and a portion other than the pattern forming portion. It become possible to form a fine pattern directly onto the surface of an article to be processed having surface unevenness.

9 Claims, 7 Drawing Sheets

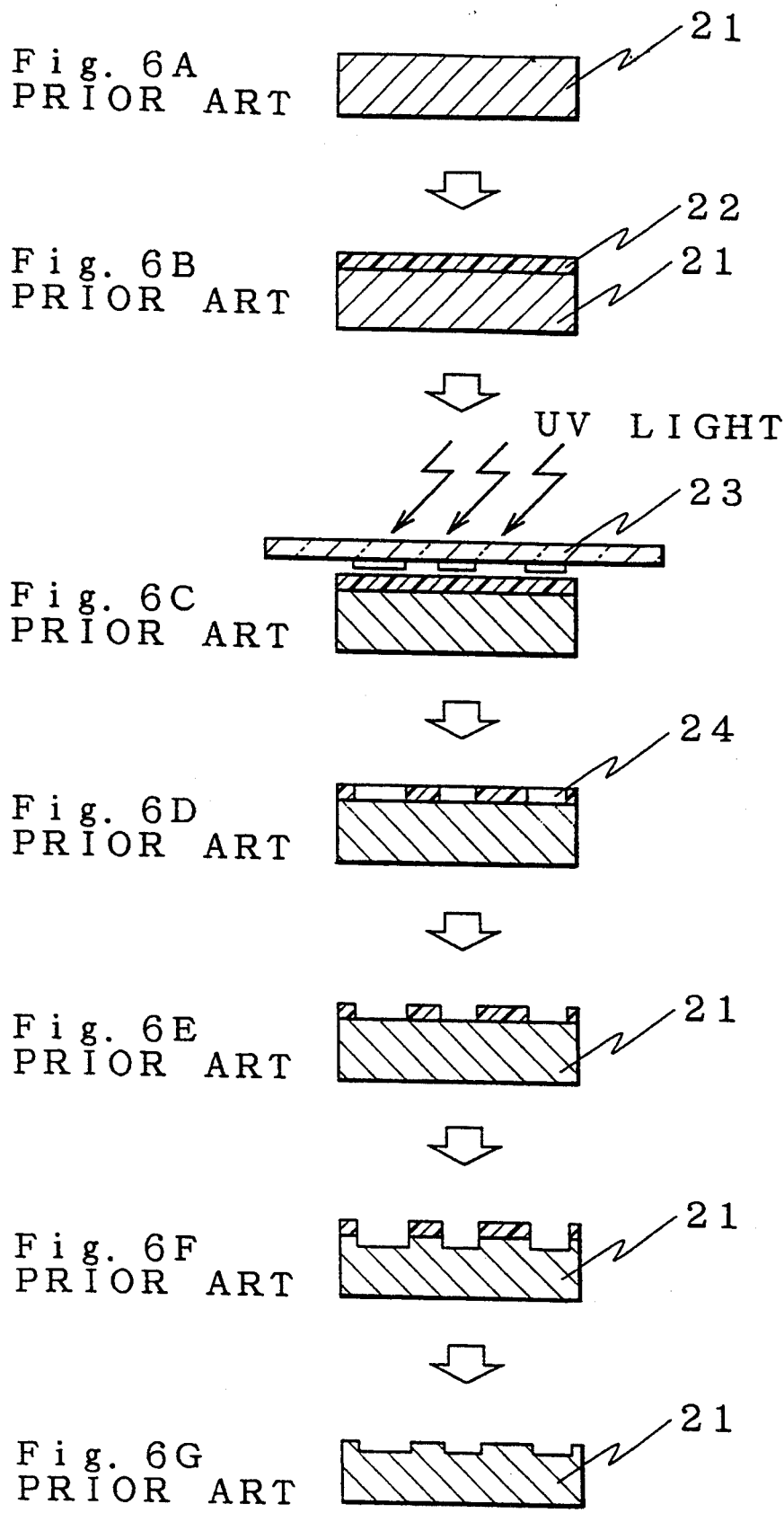

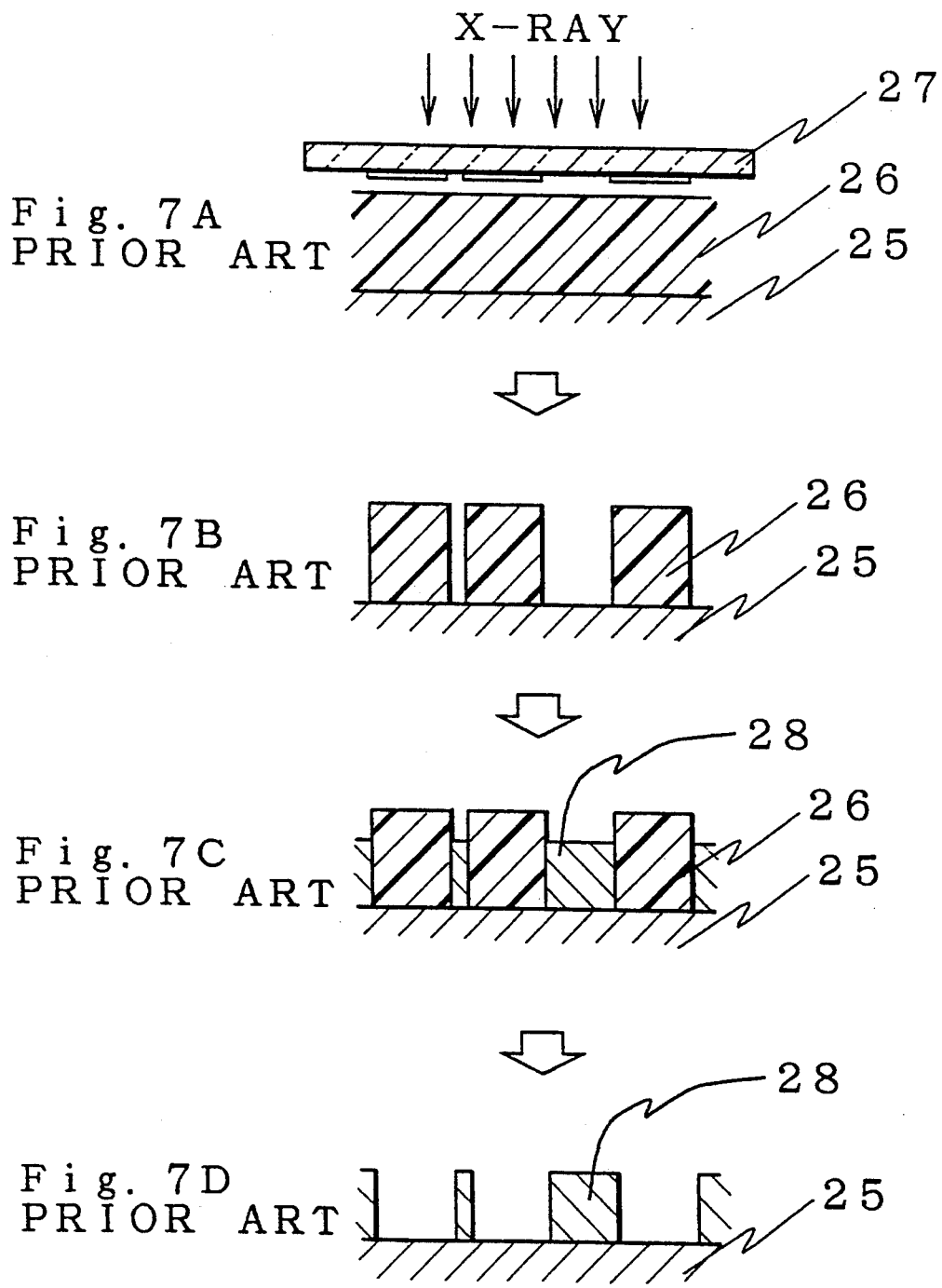

METHOD OF ELECTROCHEMICAL FINE PROCESSING

BACKGROUND OF THE INVENTION

This invention relates to a method for performing electrochemical fine processing of a surface of a material such as metal or semiconductor or the like.

In the prior art, when the fine processing of the surface of such a material is performed, a technique called photolithography has been generally used. The outline of this technique is shown in FIGS. 6A–6G.

At first, a resin (photoresist) 22 having photosensitivity and resistance to chemicals is applied on the surface of an article 21 to be processed (FIGS. 6A and 6B), and is irradiated with ultraviolet light through a mask 23 (FIGS. 6C and 6D). Next, the photoresist 24 which has been sensitized is removed by development and rinsing, allowing photoresist to remain on the article 21 to be processed exactly in accordance with a pattern drawn on the mask, while the other portions are exposed (FIG. 6E). Then, in this method, by immersion in a solution (etching solution) capable of dissolving the article 21 to be processed, the exposed portions of the article 21 to be processed are selectively removed (FIGS. 6F and 6G).

In addition, a technique is also used in practice in which no mask is used, and an electron beam the article to be processed is provided with a photoresist layer and is directly irradiated so as to form a pattern on the photoresist. At this time, it is also possible to produce a structure having a high aspect ratio by selecting an etching solution.

As another fine processing technique, there is the recently developed LIGA process. The outline of this process is shown in FIGS. 7A–7D. In FIG. 7A, X-rays emitted from a synchrotron (synchrotron emission light) are used to perform patterning of a resist 26 which may be made of acrylic, polymethylmethacrylate (PMMA) or the like thickly applied on the surface of a metal substrate 25 via a mask 27. In FIG. 7B, the exposed resist is removed by development and rinsing, and remaining portions of the resist 26 are used as a casting mold. In FIG. 7C, a metal 28 is deposited in the mold by means of electrocasting or the like. In FIG. 7D, the mold formed by the resist 26 is removed and then a fine metal structure 28 is obtained on the metal substrate 25.

Synchrotron emission light has characteristics such that the beam intensity is high, the linearity is strong and the divergence is small so that it becomes possible to accurately and deeply sensitize a mask pattern into a thickly applied resist. Therefore, when this technique is used, a fine three-dimensional shape having a high aspect ratio can be obtained.

However, in the conventional photolithography, there has been a problem that because the photomask is a flat glass substrate, when the article to be processed has an excessively uneven portion thereon, a gap is created between the photomask and the article to be processed, causing diffraction of ultraviolet light, so that it becomes difficult to accurately transfer the pattern of the mask onto the photoresist. In addition, in order to uniformly apply the photoresist onto the article to be processed, a technique called spin-coating utilizing centrifugal force is used, so that there is also a problem that when there is a level difference on the surface, uniform application of the photoresist becomes difficult. Also when the resist is directly irradiated with an electron, there is a problem of focusing the electron beam, so that it is difficult to perform patterning of a surface having complex irregularities. Further, the LIGA process must use a synchrotron, resulting in the problem of a costly apparatus.

SUMMARY OF THE INVENTION

It is an object of the present invention to provide a method for conveniently forming a fine pattern directly onto an uneven surface of an article to be processed in order to solve such conventional problems as described above.

In order to solve the above-mentioned problems, in the fine processing method of the present invention, a pattern which corresponds to a conventional photoresist pattern is electrochemically formed on the surface of an article to be processed. In accordance with the invention, this is achieved by:

a procedure in which either:

(1) a workpiece to be processed and a counter electrode having a minute forward end are installed in a solution, the minute forward end of the counter electrode is brought close to the surface of the article to be processed and an operation is performed repeatedly to electrochemically oxidize or reduce the surface of the article to be processed while moving the counter electrode, so that a pattern is electrochemically formed on the surface of the workpiece; or (2) a workpiece to be processed and a counter electrode having a minute forward end are installed in a solution, the minute forward end of the counter electrode is brought close to the surface of the article to be processed, and an operation is performed repeatedly to electrochemically deposit a substance onto the surface of the workpiece while moving the counter electrode, so that a pattern is electrochemically formed on the surface of the article; or (3) a workpiece to be processed is coated with another substance beforehand, the coated workpiece and a counter electrode having a minute forward end are installed in a solution, the minute forward end of the counter electrode is brought close to the surface of the coated workpiece and an operation is performed repeatedly to electrochemically oxidize or reduce the coating substance on the surface of the workpiece while moving the counter electrode, and then the coating substance is patterned on the surface of the workpiece using either an etching solution which does not dissolve the coating substance before the oxidation-reduction but dissolves the coating substance after the oxidation-reduction, or an etching solution in which, conversely, the coating substance is dissolved before the oxidation-reduction but not after; to thereby form a pattern of the substance having a resistance to etching different from that of the rest of the workpiece at the surface of the workpiece. Thereafter, the processing is performed in the same manner as conventional photolithography using an etching solution in which the formed pattern is not dissolved but the article to be processed is dissolved.

A fine processing apparatus for carrying out the above-mentioned fine processing method is constituted by a counter electrode having a minute forward end, a mechanism for moving the counter electrode to an optional position, and a mechanism for controlling an electrochemical electric potential of an article to be processed.

Moreover, the counter electrode having a plurality of minute forward ends performs the fine processing in a plurality of minute regions of the surface of the article to be processed.

In the fine processing method as described above, in the electrochemical cell provided with the counter electrode having a minute forward end, the minute forward end of the counter electrode is brought close to the surface of the article to be processed as far as possible, to form an electrochemical reaction field only in the vicinity of the forward end of the counter electrode. And the electrochemical reaction or any one of the oxidation—reduction of the surface of the article to be processed, the deposition of the substance from the solution onto the surface of the article to be processed, or the oxidation—reduction of the coating substance coating the surface of the article to be processed beforehand is allowed to occur. However, these electrochemical reactions are limited to the vicinity of the forward end of the counter electrode. Thus, when this operation is repeated while moving the counter electrode along the surface of the article to be processed, the pattern can be electrochemically formed on the surface of the article. In this case, even if there is unevenness on the surface of the article, when the position of the forward end of the counter electrode is supported so as to always maintain a constant distance from the article, there is no hindrance at all in forming the pattern electrochemically.

BRIEF DESCRIPTION OF THE DRAWING

FIGS. 6A–6G are elevational cross-sectional views showing a conventional photolithography technique.

FIGS. 7A–7D are elevational cross-sectional views showing a conventional LIGA process.

DESCRIPTION OF THE PREFERRED EMBODIMENTS

The fine processing method of the present invention will be described hereinafter with reference to drawings.

EXAMPLE 1

FIGS. 1A–1G illustratively show one of the fine processing method of the present invention.

Figure 1A:
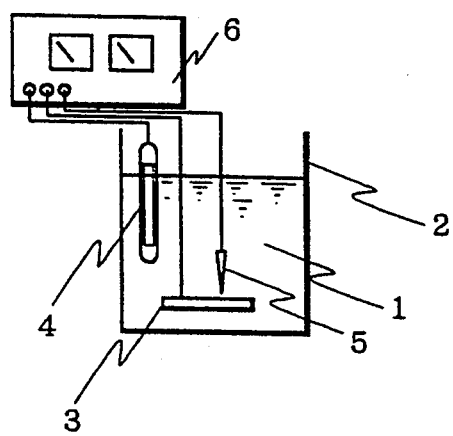
FIGS. 1A–1G are pictorial views showing an embodiment of the fine processing method of the present invention.

In FIG. 1A, and article 3 to be processed, a reference electrode 4 and a counter electrode 5 are immersed in a container 2 filled with a solution 1, so as to constitute an electrochemical cell. Further, the article to be processed, reference electrode 4 and counter electrode 5 are electrically connected to a potentiostat 6, so that the electrochemical electric potential of the article to be processed can be controlled. In this case, reference electrode 4 is an electrode for generating an electric potential to serve as a standard in the case of controlling the electrode electric potential in the electrochemical reaction, for which generally a saturated calomel electrode (SCE) or a silver - silver chloride electrode is frequently used. In addition, counter electrode 5 is shaped to have a minute forward end.

While in the present example, the electrochemical cell includes a reference electrode, reference electrode 4 is not always necessary, and it is also possible to constitute an electrochemical cell by two electrodes constituted by the article to be processed and the counter electrode. In such a case, a direct current electric source, of which the voltage can be optionally controlled, is used instead of the potentiostat.

Figure 1B:
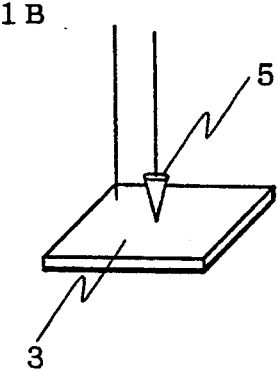

In FIG. 1B, the forward end of counter electrode 5 is installed at a position nearest to a region of the article 3 which is to be processed and, using the potentiostat 6, the electric potential of article 3 is set to a value capable of causing electrochemical oxidization or reduction of article 3.

Figure 1C:
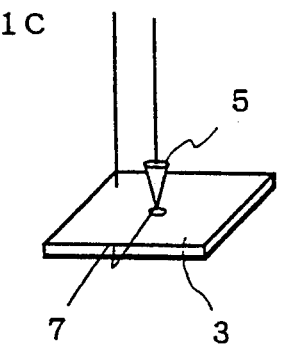

At this time, in FIG. 1C, the electrochemical reaction occurs at the surface of article 3 in the vicinity of the forward end of counter electrode 5, and article 3 itself becomes oxidized or reduced, whereby a thin film 7 comprising its oxidized or reduced product is formed on the surface of article 3. For example, when article 3 is made of silicon, if the electric potential is set to be not less than 0.86 V with respect to a standard hydrogen electrode, then it is possible to form a thin film of silicon oxide on the silicon surface.

Figure 1D:
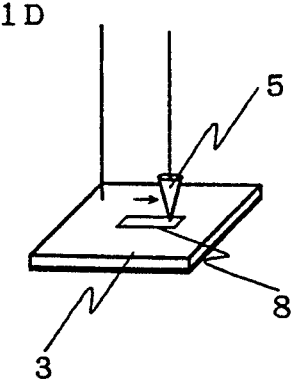

In FIG. 1D, when the forward end of counter electrode 5 is slowly moved across the surface of article 3 in accordance with a processing pattern while maintaining the above-mentioned electric potential, the thin film 7 is continuously formed along a region across which the counter electrode 5 moves, in the shape of a pattern 8. At this time, it is necessary to always keep the distance between the surface of article 3 and the forward end of counter electrode 5 constant.

Figure 1E:
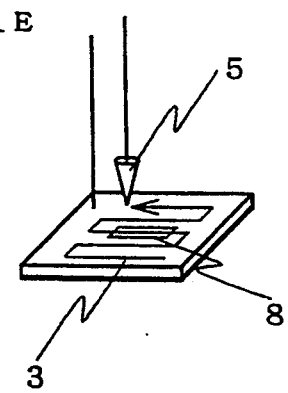

Alternatively, in FIG. 1E, the pattern 8 can also be formed in the same manner by scanning counter electrode 5, starting from one edge or corner of article 3, across the surface of article 3 in accordance with a certain pattern, and applying an electric potential when the counter electrode moves along a region where oxidation-reduction is to be performed.

Figure 1F:
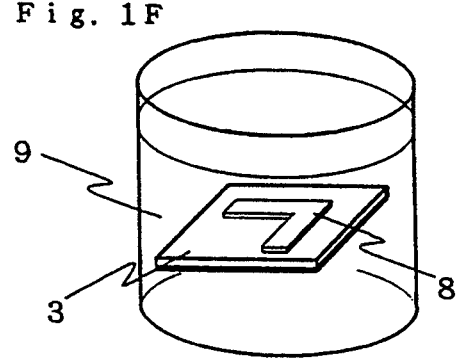

In FIG. 1F, when the necessary pattern has been formed on the surface of article 3, article 3 is subsequently immersed in a solution (etching solution) 9 in which portions of article 3 which do not coincide with the pattern are selectively dissolved but the region of the pattern is not dissolved, so as to selectively remove only the portion not subjected to the pattern formation on the surface of article 3, namely the exposed portion. For example, when the pattern is formed on a silicon surface using silicon oxide, a mixed solution of hydrofluoric acid and nitric acid is used as the etching solution. This solution is not able to dissolve silicon oxide but does dissolve silicon, so that it is possible to selectively dissolve the portion where silicon is exposed. Before performing this operation, nonprocessing surfaces of article 3 should be coated beforehand with a substance having a resistance to the etching solution.

Figure 1G:
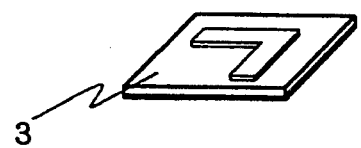

Finally, in FIG. 1G, the pattern is removed with a solution which dissolves only the electrochemically formed pattern but does not dissolve article 3 itself. For example, when the pattern is formed of silicon oxide on a silicon surface, a mixed solution of hydrofluoric acid and ammonium fluoride is used as the etching solution.

EXAMPLE 2

FIGS. 2A–2G illustratively show another example of the fine processing method of the present invention.

Figure 2A:
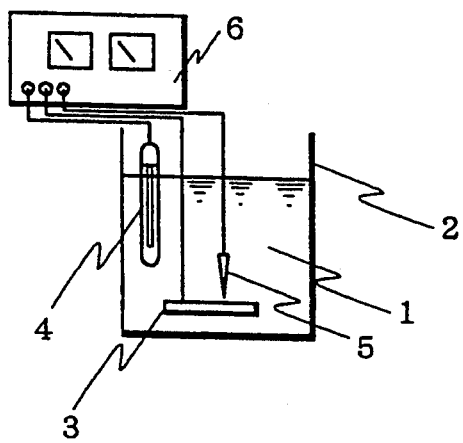
FIGS. 2A–2G are pictorial views showing another embodiment of the fine processing method of the present invention.

At first, in FIG. 2A, an article to be processed 3, a reference electrode 4 and a counter electrode 5 are immersed in a container 2 filled with a solution 1, so as to constitute an electrochemical cell. Further, article 3, reference electrode 4 and counter electrode 5 are electrically connected to a potentiostat 6, so that the electrochemical electric potential of article 3 can be controlled. At this time, article 3 must be a substance having an appropriate conductivity or a substance with its surface coated with a material having an appropriate conductivity.

In this case, reference electrode 4 is an electrode for generating an electric potential to serve as a standard for controlling the electrode electric potential in the electrochemical reaction, for which generally a saturated calomel electrode (SCE) or a silver - silver chloride electrode is often used. In addition, counter electrode 5 is shaped to have a minute forward end.

While in the present example, the electrochemical cell includes a reference electrode, reference electrode 4 is not always necessary, and it is also possible to constitute an electrochemical cell by two electrodes constituted by article 3 and counter electrode 5. In such a case, a direct current electric source, of which the voltage can be optionally controlled, is used instead of the potentiostat.

Figure 2B:
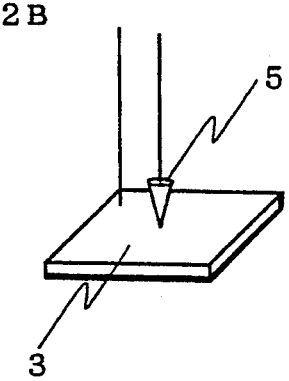

In FIG. 2B, the forward end of counter electrode 5 is installed at a position nearest to a region of the article 3 which is to be processed and, using the potentiostat 6, the electric potential of article 3 is set to a value capable of electrochemically depositing a substance from the solution onto article 3.

Figure 2C:
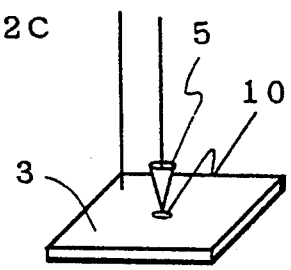

At this time, in FIG. 2C, an electrochemical reaction occurs at the surface of article 3 in the vicinity of the forward end of counter electrode 5, and a thin film 10 of the deposited substance is formed on the surface of article 3. For example, when article 3 is made of gold, and the electric potential is set to be not more than $-1.34$ V with respect to a standard hydrogen electrode in a mixed solution of chromic acid and sulfuric acid, then it is possible to form a thin film of chromium on the surface of gold article 3.

Figure 2D:
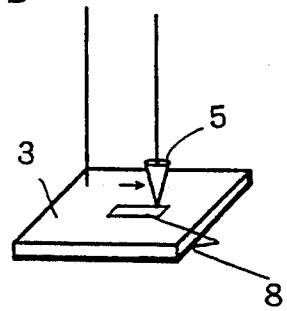

In FIG. 2D, when the forward end of counter electrode 5 is slowly moved across the surface of article 3 in accordance with a processing pattern while maintaining the above-mentioned electric potential, the thin film 10 is continuously formed along a region across which the counter electrode 5 moves, in the shape of a pattern 8. At this time, it is necessary to always keep the distance between the surface of article 3 and the forward end of counter electrode 5 constant.

Figure 2E:
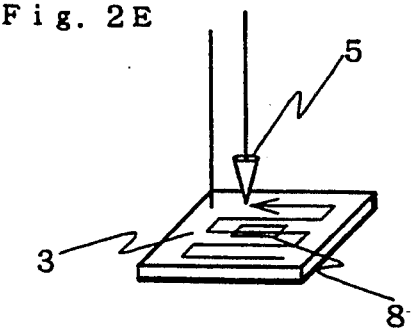

Alternatively, in FIG. 2E, the pattern 8 can also be formed in the same manner by scanning counter electrode 5, starting from one edge or corner of article 3, across the surface of article 3 in accordance with a certain pattern, and applying an electric potential when the counter electrode moves along a region where oxidation and reduction are performed.

Figure 2F:
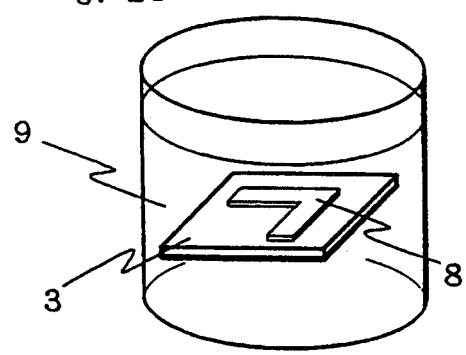

In FIG. 2F, when the necessary pattern has been formed on the surface of article 3, article 3 is subsequently immersed in a solution (etching solution) 9 in which portions of article 3 which do not coincide with the pattern are selectively dissolved but the region of the pattern is not dissolved, so as to selectively remove only the portion not subjected to the pattern formation on the surface of article 3, namely the exposed portion. For example, when the pattern is formed on a gold surface using chromium, a solution containing iodine and potassium iodide is used as the etching solution. This solution is not capable of dissolving chromium but is capable of dissolving gold, so that it is possible to selectively dissolve the regions where gold is exposed. Before performing this operation, non-processing surfaces of article 3 should be coated beforehand with a substance which is resistant to the etching solution.

Figure 2G:
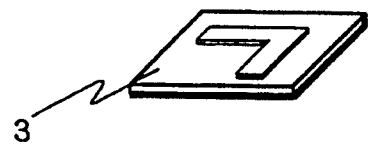

Finally, in FIG. 2G, the pattern is removed with a solution in which only the electrochemically formed pattern is dissolved but article 3 itself is not dissolved. For example, when the pattern is formed on the gold surface with chromium, an alkaline solution of potassium ferricyanide is used.

EXAMPLE 3

FIGS. 3A–3I illustratively show another example of the fine processing method of the present invention.

Figure 3A:
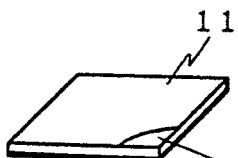
FIGS. 3A–3I are pictorial views showing another embodiment of the fine processing method of the present invention.

At first, in FIG. 3A, the surface of an article 3 to be processed is coated with a coating substance 11 of a composition such that its resistance to an etching solution can be changed by electrochemically performing oxidation or reduction. For example, when article 3 is gold, silicon may be used as the coating substance and this coating substance may be deposited on the surface of article 3 by chemical vapor deposition (CVD) or the like. At this time, it is necessary to adjust the thickness of a coating film to a degree which permits the electrochemical reaction to proceed from the surface of the coating film.

Figure 3B:
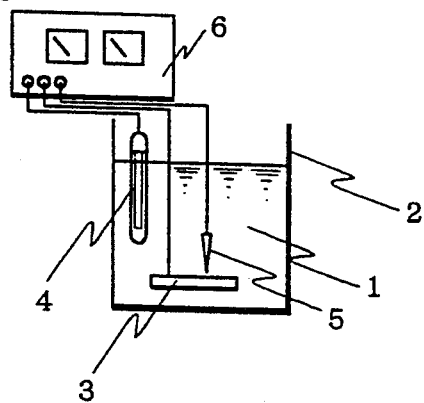

Next, in FIG. 3B, article 3 coated with the coating substance 11, a reference electrode 4 and a counter electrode 5 are immersed in a container 2 filled with a solution 1, so as to constitute an electrochemical cell. Further, article 3, reference electrode 4 and counter electrode 5 are electrically connected to a potentiostat 6, so that the electrochemical electric potential of article 3 can be controlled. In this case, reference electrode 4 is an electrode for generating an electric potential to serve as a standard when controlling the electrode electric potential in the electrochemical reaction, for which generally a saturated calomel electrode (SCE) or a silver - silver chloride electrode is often used. In addition, the counter electrode is shaped to have a minute forward end.

While in the present example, the electrochemical cell includes a reference electrode, reference electrode 4 is not always necessary, and it is also possible to constitute an electrochemical cell by two electrodes constituted by article 3 and counter electrode 5. In such a case, a direct current electric source, of which the voltage can be optionally controlled, is used instead of the potentiostat.

Figure 3C:
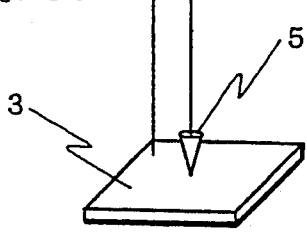

In FIG. 3C, the forward end of counter electrode 5 is installed at a position nearest to article 3, and using the potentiostat 6, the electric potential of article 3 is set to an electric potential capable of electrochemically oxidizing or reducing the coating substance coating the surface of article 3.

Figure 3D:
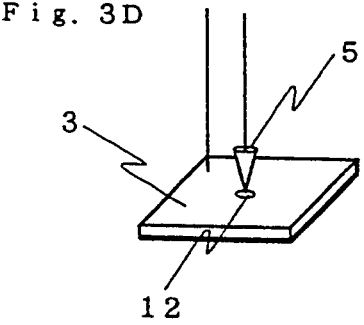

At this time, in FIG. 3D, the electrochemical reaction occurs at the surface of article 3 in the vicinity of the forward end of counter electrode 5, and a thin layer 12 comprising an oxidation reduction product of the coating substance is formed. For example, when silicon is the substance 11 coated on the surface of gold article 3, if the electric potential is set to be not less than 0.86 V with respect to a standard hydrogen electrode, then it is possible to form a thin film of silicon oxide on a part of the silicon coating film.

Figure 3E:
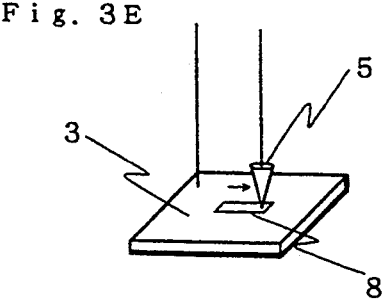

In FIG. 3E, when the forward end of counter electrode 5 is slowly moved across the surface of article 3 in accordance with a processing pattern while maintaining the above-mentioned electric potential, the film layer 12 is continuously formed along a region across which the counter electrode 5 moves, in the shape of a pattern 8. At this time, it is necessary to always keep the distance between article 3 and the forward end of counter electrode 5 constant.

Figure 3F:
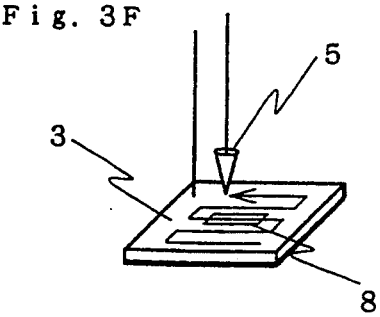

Alternatively, in FIG. 3F, the pattern 8 can also be formed in the same manner by scanning counter electrode 5, starting from one edge or corner of article 3, across the surface of article 3 in accordance with a certain pattern, and applying an electric potential when the counter electrode moves along a region where the oxidation-reduction reaction is to occur.

Figure 3G:
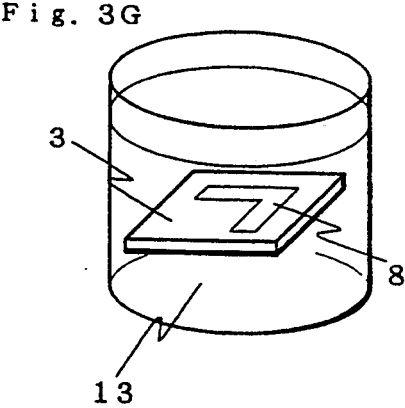

In FIG. 3G, when the necessary pattern has been formed on coating substance 11 on the surface of article 3, article 3 is subsequently immersed in either a solution in which the oxidation-reduction product of the coating substance is dissolved but the coating substance not subjected to oxidation-reduction is not dissolved, or a solution in which oppositely the oxidation-reduction product of the coating substance is not dissolved but the coating substance not subjected to oxidation-reduction is dissolved, so as to perform selective removal of the coating substance. For example, when the surface of gold article 3 is coated with silicon substance 11, and electrochemically subjected to the pattern formation of silicon oxide, a mixed solution of hydrofluoric acid and nitric acid is used as the etching solution 13 for producing the pattern. This solution dissolves silicon but does not dissolve silicon oxide, so that only silicon will be selectively dissolved.

Figure 3H:
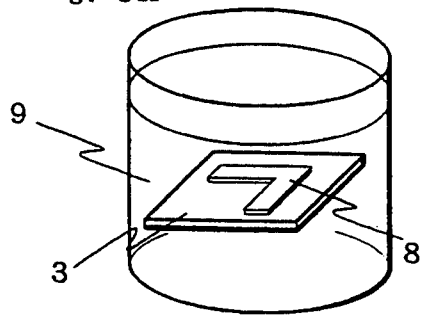

Next, in FIG. 3H, article 3 is immersed in a solution (etching solution) 9 which selectively dissolves only material from article 3 but does not dissolve the coating substance remaining on the surface of article 3 after the step of FIG. 3G, to selectively remove only the portion where article 3 is exposed. For example, when the surface of gold article 3 is coated with silicon substance 11 and electrochemically oxidized to form a pattern with silicon oxide, a solution containing iodine and potassium iodide is used as the etching solution.

This solution will not dissolve the silicon oxide but will dissolve the gold, so that it is possible to selectively dissolve gold in the exposed regions. Before performing this operation, non-processing surfaces of article 3 should be coated beforehand with a substance which is resistant to the etching solution.

Figure 3I:
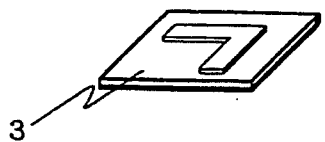

Finally, in FIG. 3I, the remaining substance 11 of pattern 8 is removed with a solution in which the pattern remaining on article 3 in FIG. 3G is dissolved but article 3 itself is not dissolved. For example, when the pattern is formed on the surface of gold article 3 with silicon oxide, a mixed solution of hydrofluoric acid and ammonium fluoride is used as the removal solution.

Next, fine processing apparatus according to the present invention will be described with reference to FIG. 4.

Figure 4:
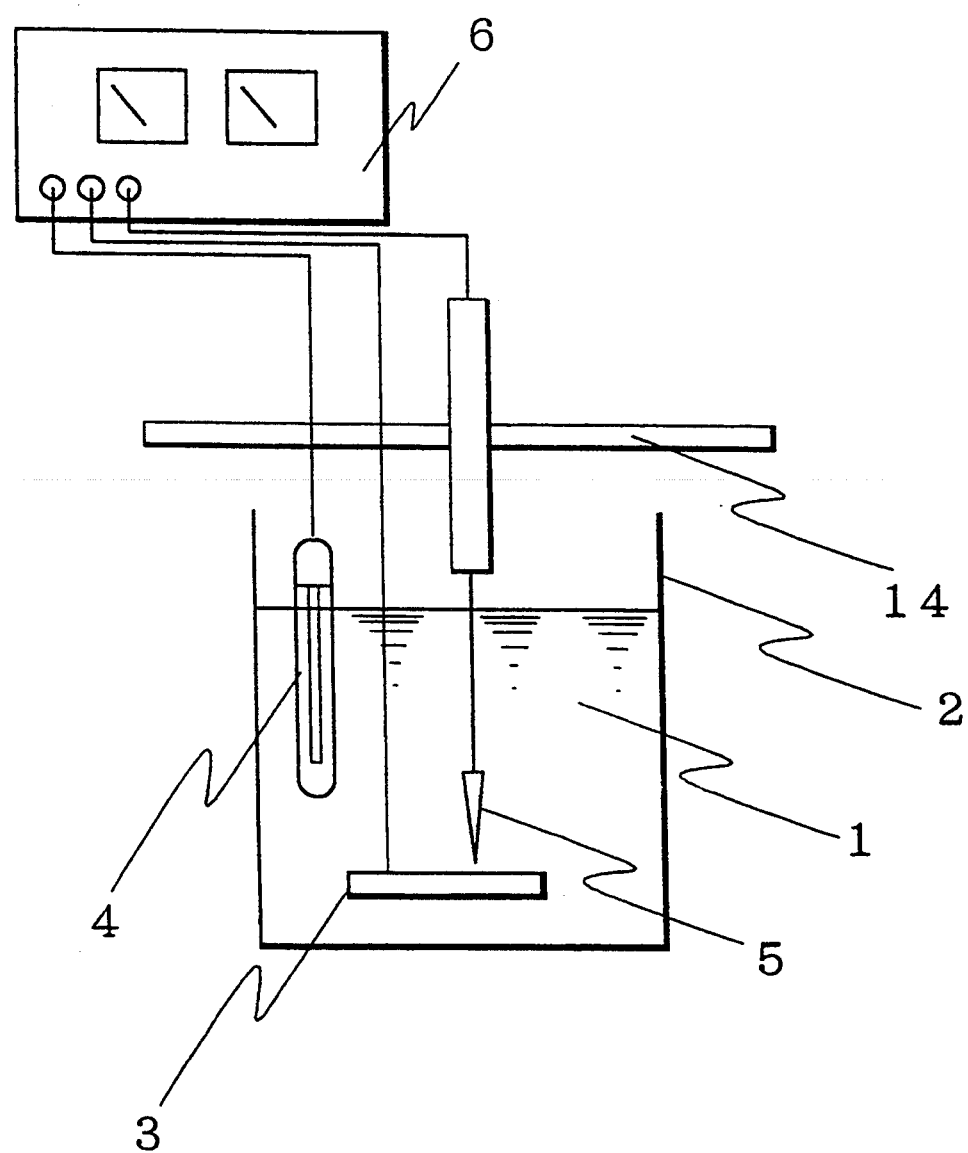
FIG. 4 is a pictorial view of a fine processing apparatus to be used for the present invention.

FIG. 4 is an illustrative view of a fine processing apparatus to be used for the present invention. An article 3 to be processed, a reference electrode 4 and a counter electrode 5 are immersed in a solution 1 filled in a container 2. Further, article 3, reference electrode 4 and counter electrode 5 are electrically connected to a potentiostat 6. In this case, reference electrode 4 is an electrode for generating an electric potential to serve as a standard when controlling the electrode electric potential in the electrochemical reaction, for which generally a saturated calomel electrode (SCE) or a silver-silver chloride electrode is often used. In addition, the counter electrode is shaped to have a minute forward end. While the electrochemical cell includes a reference electrode, reference electrode 4 is not always necessary, and it is also possible to constitute an electrochemical cell by two electrodes constituted by article 3 and counter electrode 5. In such a case, a direct current electric source, of which the voltage can be optionally controlled, is used instead of the potentiostat.

Counter electrode 5 is coated with an insulator except at its forward end and electrode 5 is supported by a movement mechanism 14 which can accurately move electrode 5 to any desired position above article 3 in a three dimensional manner. In this embodiment, article 3 is fixed, and counter electrode 5 is moved by movement mechanism 14. However, conversely, it is also possible to provide an arrangement in which counter electrode 5 is fixed, and article 3 is supported by a movement mechanism.

Figure 5:
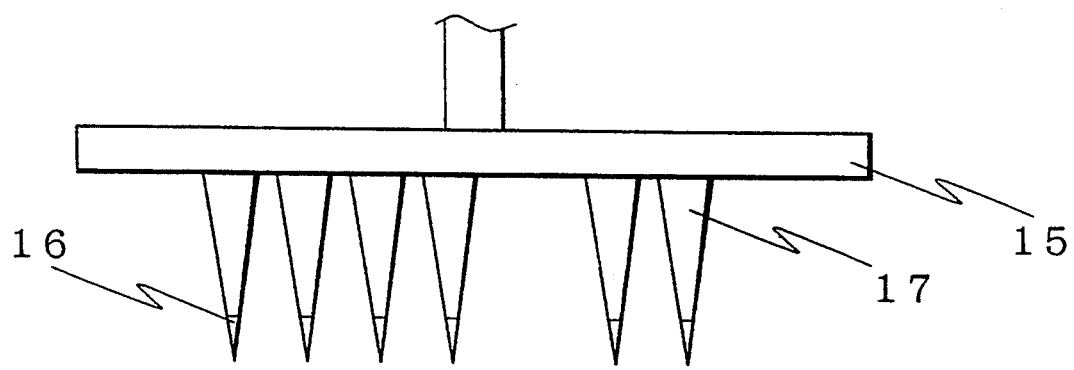
FIG. 5 is a side elevational view showing an example of the structure of the counter electrode to be used in fine processing apparatus of the present invention.

In addition, another example of a counter electrode, 15, is shown in FIG. 5. The counter electrode 15 has a plurality of the projections 16, each with a minute, pointed forward end, arranged in a pattern bearing a correspondence with the pattern to be produced. Therefore, the processing can be performed simultaneously in a plurality of minute regions on the surface of article 3. The portions of the projections 16 other than the forward ends are coated with an insulator 17.

Counter electrode 15 is moved by movement mechanism 14 to a position where the processing of article 3 is intended to be performed, and further the vertical distance between article 3 and counter electrode 15 is kept sufficiently small and constant. Next, using the potentiostat, the electric potential of article 3 is set to be any one of: an electric potential at which article 3 is subjected to oxidation-reduction; an electric potential at which the coating substance coating article 3 is subjected to oxidation-reduction; or an electric potential at which the substance is deposited from the solution onto article 3. These electrochemical reactions occur in an isotropic manner under the center of the or each forward end of the counter electrode, which is or are most adjacent to article 3 when the surface of article 3 is smooth and has no defect. These electrochemical reactions occur simultaneously at a plurality of places in the case of a plurality of projections, as in the embodiment of FIG. 5, so that when a plurality of projections are arranged on the counter electrode in accordance with an intended processing pattern, it becomes possible to simultaneously perform the processing at various regions of the pattern. Further, a pattern can be easily formed continuously by moving the counter electrode slowly using the movement mechanism while maintaining the appropriate electric potential.

As explained above, by using the fine processing method of the present invention, it has become possible to electrochemically form, on article 3, a pattern having a resistance to the etching solution which is different from the resistance of article 3. This pattern formation, different from the conventional photolithography, can be performed with no trouble by maintaining a given distance between the counter electrode and article 3 even when article 3 has an uneven surface. For example, as mentioned in the description of the embodiment of FIG. 5, mechanism 14 can also control movement of counter electrode 5 or 15 in the vertical direction. In addition, it has become possible to perform easily the pattern formation without necessitating a large-scale apparatus such as a synchrotron and the like.

What is claimed is:

1. An electrochemical fine processing method comprising the steps of:

providing a workpiece having a surface which exhibits, with respect to a given etchant, an etching resistance having a first value;

providing a counter electrode having a small forward end;

forming, on the workpiece surface, by an electrochemical reaction between the workpiece and the counter electrode in an electrolyte solution, a patterned region having, with respect to the given etchant, an etching resistance having a second value different from the first value, by:

placing the workpiece and the forward end of the counter electrode in an electrolytic solution, with the forward end of the counter electrode close to the surface of the workpiece; and establishing an electric potential between the counter electrode and the workpiece surface, with the electrolytic solution present between the counter electrode and the workpiece surface, in order to form, on the workpiece surface, localized regions which have the second etching resistance value and make up the patterned region; and etching the workpiece, after said forming step, in an etching solution of the given etchant in order to form, at the workpiece surface, a relief pattern corresponding to the patterned region.

2. An electrochemical fine processing method according to claim 1 wherein the electrochemical reaction is an oxidation reaction to oxidize the surface of the workpiece in the patterned region.

3. An electrochemical fine processing method according to claim 1 wherein the electrochemical reaction is a reduction reaction to chemically reduce the surface of the workpiece in the patterned region.

4. An electrochemical fine processing method according to claim 1 wherein the electrochemical reaction is a deposition reaction to deposit a substance from the electrolytic solution on the surface of the workpiece in the patterned region.

5. An electrochemical fine processing method according to claim 1 wherein said step of providing a workpiece comprises coating the workpiece with a coating substance having an etching resistance which can be altered.

6. An electrochemical fine processing method according to claim 1 wherein the etchant has a composition selected to etch workpiece surface portions having the second etching resistance value, corresponding to the patterned region, and to substantially not etch workpiece surface portions having the first etching resistance value.

7. An electrochemical fine processing method according to claim 1 wherein the etchant has a composition selected to substantially not etch workpiece surface portions having the second etching resistance value, corresponding to the patterned region, and to etch workpiece surface portions having the first etching resistance value.

8. An electrochemical fine processing method according to claim 1 wherein the counter electrode has a plurality of projections each having a small forward end, with said forward ends of said plurality of projections positioned relative to one another in correspondence with the configuration of the patterned region.

9. An electrochemical fine processing method according to claim 1 wherein said step of etching is carried out to etch substantially only workpiece surface portions having one of the first and second etching resistance values.

* * * * *